United States Patent
Sasagawa

(10) Patent No.: US 7,417,668 B2
(45) Date of Patent: Aug. 26, 2008

(54) DIGITAL CAMERA

(75) Inventor: Mikio Sasagawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 734 days.

(21) Appl. No.: 10/820,107

(22) Filed: Apr. 8, 2004

(65) Prior Publication Data

US 2004/0202456 A1     Oct. 14, 2004

(30) Foreign Application Priority Data

Apr. 9, 2003 (JP) ............................. 2003-104964

(51) Int. Cl.
*H04N 5/225* (2006.01)
(52) U.S. Cl. ................................................. 348/220.1
(58) Field of Classification Search .................. 386/120; 348/220.1
See application file for complete search history.

(56) References Cited

U.S. PATENT DOCUMENTS 6,295,086 B1 * 9/2001 Fukushima et al. ...... 348/231.1
7,197,228 B1 * 3/2007 Monroe et al. ................ 386/46

FOREIGN PATENT DOCUMENTS

| JP | 07-177453 A | 7/1995 |
| JP | 9-130721 A | 5/1997 |
| JP | 2000-152165 A | 5/2000 |
| JP | 2002-171436 A | 6/2002 |

* cited by examiner

*Primary Examiner*—James M Hannett
(74) *Attorney, Agent, or Firm*—Birch, Stewart, Kolasch & Birch, LLP

(57) ABSTRACT

Moving pictures are played back and displayed in a "moving picture display area" of a liquid crystal monitor. If a menu/OK button is pressed and a still picture extract command is issued during playback of moving pictures, then a predetermined number of frames of the still picture data obtained immediately before, immediately after, and before and after the moment when the still picture extract command is input is extracted together with the still picture data obtained at the moment when the still picture extract command is input from the moving picture data at predetermined intervals. Then, it is played back and displayed in a "still picture display area" of the liquid crystal monitor, and is recorded as a still picture file in a memory card.

8 Claims, 14 Drawing Sheets

FIG.7A
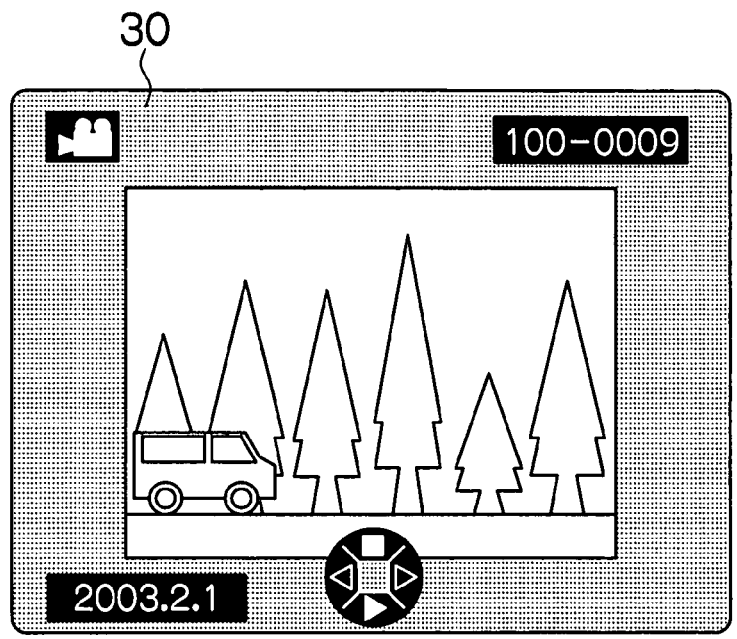
FIG.7B
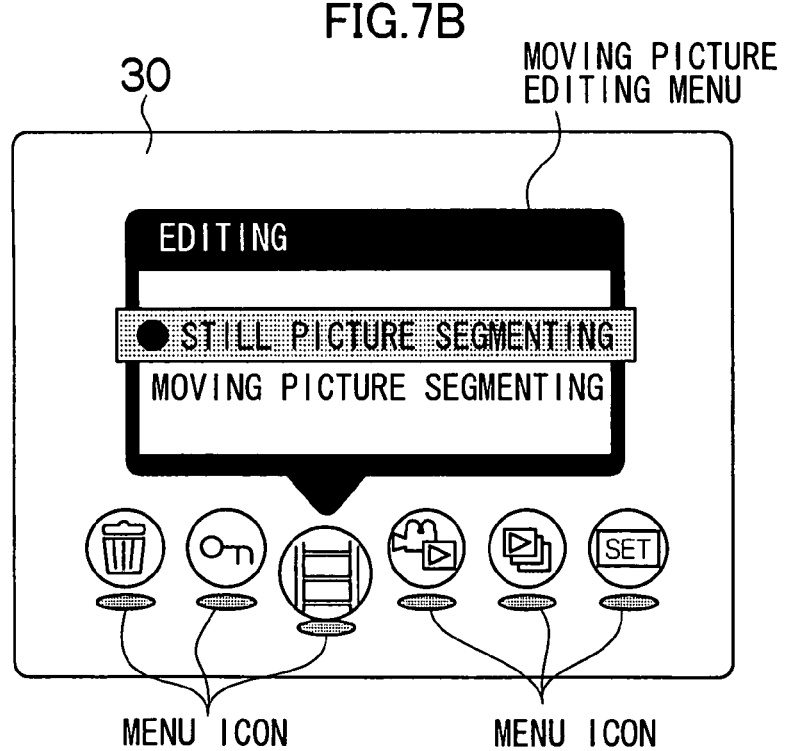

FIG.8A
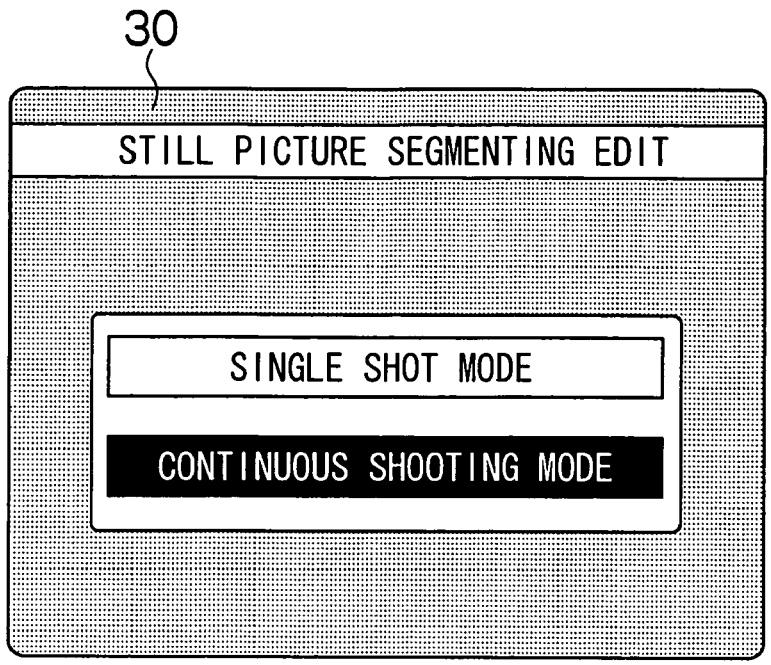
FIG.8B
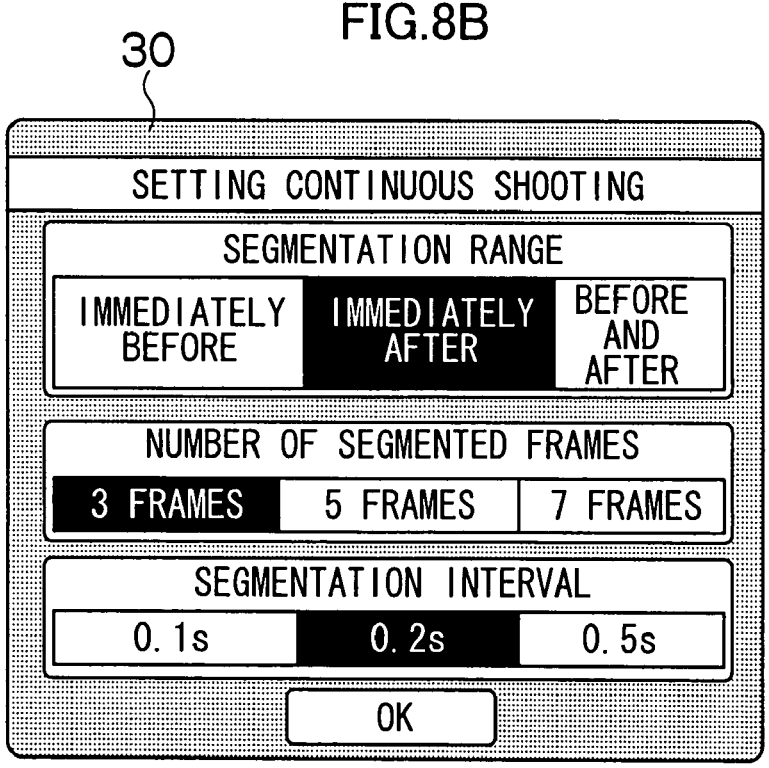

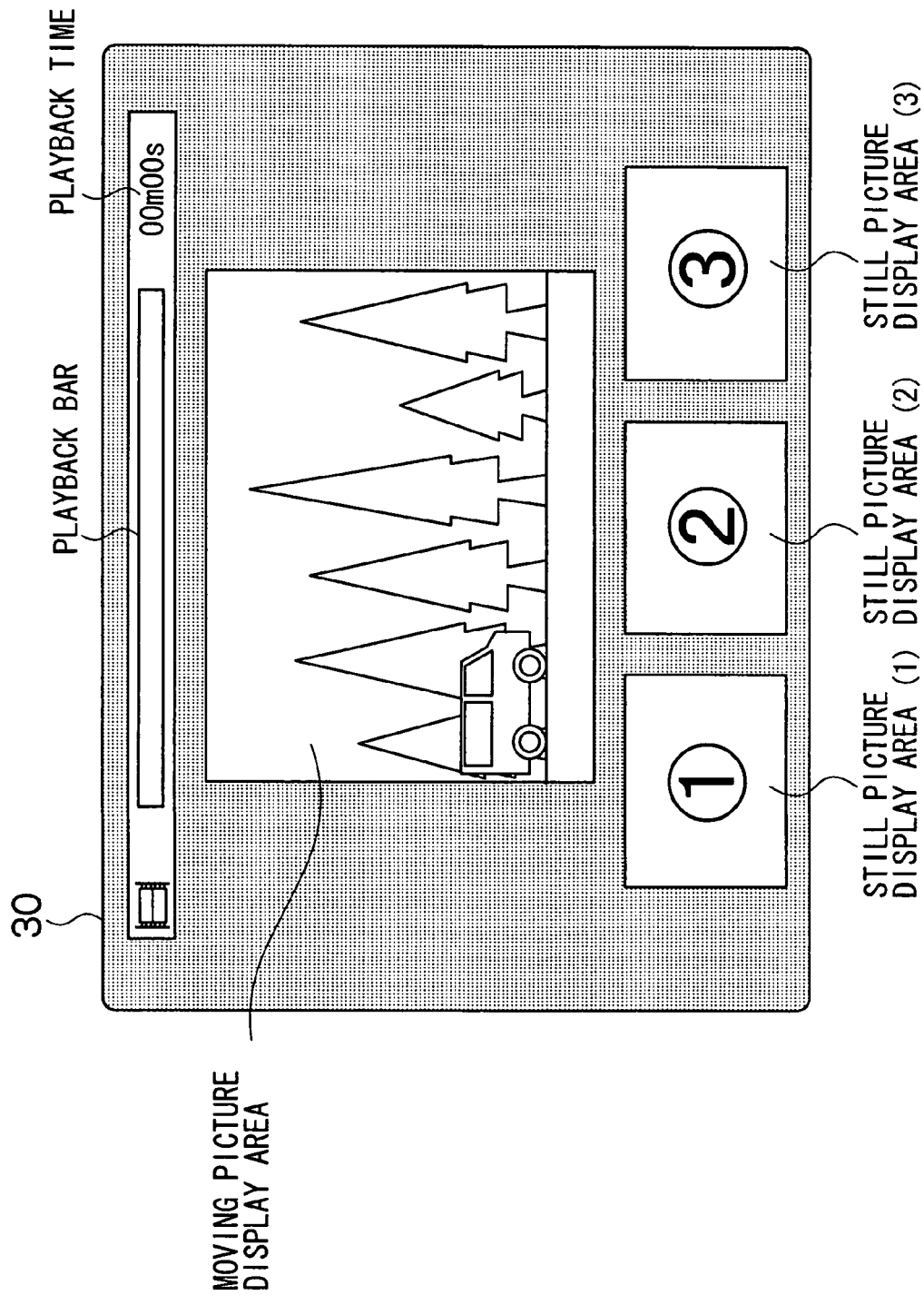

DIGITAL CAMERA

This Nonprovisional application claims priority under 35 U.S.C. § 119(a) on Patent Application No(s). 2003-104964 filed in Japan on Apr. 9, 2003, the entire contents of which are hereby incorporated by reference.

BACKGROUND OF THE INVENTION

1. Field of the Invention

The present invention relates to an image processing program and an image processing apparatus, and more specifically to an image processing program and an image processing apparatus capable of extracting a still picture from moving pictures and recording the extracted image.

2. Description of the Related Art

Conventionally, a still picture is segmented from captured moving pictures, and recorded on a record medium as still picture data separately from the original moving picture data.

For example, Japanese Patent Application Publication No. 7-177453 discloses an apparatus capable of taking a favorite scene with a shutter key pressed while confirming moving pictures played back on a screen so that the scene can be printed as a still image on the apparatus.

Japanese Patent Application Publication No. 2000-152165 also proposes extracting an output scene at predetermined time intervals from moving pictures recorded on a record medium, and outputting the scene as a still picture on another record medium.

SUMMARY OF THE INVENTION

However, in Japanese Patent Application Publication No. 7-177453, only one specific scene can be recorded (printed) as a still picture. Therefore, if the images before and after the specific image are to be recorded, the corresponding scenes are to be individually specified. Especially, when a plurality of frames are to be recorded at predetermined intervals in continuous shooting, etc., the user who takes the images has to specify each image to be recorded by appropriately adjusting the timing, thereby requiring a laborious operation.

Furthermore, in Japanese Patent Application Publication No. 2000-152165, since a still picture is automatically extracted from the head of the moving pictures at predetermined intervals, a user cannot extract a desired scene.

The present invention has been developed to solve the above-mentioned problems, and aims at providing an image processing program and an image processing apparatus capable of easily segmenting images around a favorite scene from moving pictures and recording the images.

To attain the above-mentioned objective, the first aspect of the present invention provides an image processing program used to direct a computer to perform the functions of: playing back moving picture data recorded on a record medium, and displaying moving pictures in a moving picture display area set on a monitor; extracting a predetermined number of frames of still picture data immediately before, after, or before and after a moment when a still picture extract command is input, from moving picture data at predetermined intervals, together with still picture data at the moment when the still picture extract command is input, based on the still picture extract command input during playback of the moving picture data; playing back each piece of the extracted still picture data, and displaying a still picture in a plurality of still picture display areas set in an area different from the moving picture display area on the monitor; and recording each piece of the extracted still picture data on a record medium.

According to the first aspect of the present invention, when a still picture extract command is input, a predetermined number of frames of still picture data immediately before, after, or before and after a moment when the still picture extract command is input are extracted from moving picture data at predetermined intervals together with still picture data at the moment when the still picture extract command is input, and recorded on a record medium. The extracted still picture data is played back on the monitor together with the moving pictures. At this time, the still picture is displayed on a still picture display area different from the moving picture display area in which the moving pictures are displayed.

To attain the above-mentioned objective, the second aspect of the present invention provides an image processing apparatus which includes: a moving picture playback device which plays back moving picture data recorded on a record medium, and displays moving pictures in a moving picture display area set on a monitor; a record instruction device which designates a frame of a moving picture displayed in the moving picture display area to be recorded as a still picture; a still picture data extraction device which extracts a predetermined number of frames of still picture data immediately before, after, or before and after a moment when a record instruction is received from moving picture data at predetermined intervals together with still picture data at the moment when the record instruction is received based on the record instruction received from the record instruction device; a still picture playback device which plays back each piece of the still picture data extracted by the still picture data extraction device, and displays a still picture in a plurality of still picture display areas set in an area different from the moving picture display area on the monitor; and a recording device which records each piece of the still picture data extracted by the still picture data extraction device on a record medium.

According to the second aspect of the present invention, when a record instruction is received from a record instruction device during playback of moving pictures, a predetermined number of frames of still picture data immediately before, after, or before and after a moment when a record instruction is received are extracted from moving picture data at predetermined intervals together with still picture data at the moment when the record instruction is received by the still picture data extraction device. The extracted still picture data is recorded on a record medium by a recording device separately from the moving picture data. Thus, images around the selected image can be obtained, and can also be segmented as those by continuous shooting. Furthermore, the extracted still picture data is played back on the monitor together with the moving pictures by a still picture playback device. At this time, the still picture is displayed in the still picture display area different from the moving picture display area. Thus, a glance at the still picture extracted from the moving pictures can allow it to be immediately checked.

To attain the above-mentioned objective, third aspect of the present invention provides the image processing apparatus described by referring to the second aspect of the present invention. It further includes an extraction condition instruction device which designates a number of frames and intervals of still picture data to be extracted from the moving picture data. The still picture data extraction device extracts the still picture data at the intervals and the number of frames of the still picture data designated by the extraction condition instruction device from the moving picture data.

According to the third aspect of the present invention, the number of frames of segmented still pictures and the intervals can be optionally designated.

To attain the above-mentioned objective, the fourth aspect of the present invention provides the image processing apparatus which is described by referring to the second and third aspects of the present invention. The apparatus further includes a record execution instruction device which designates execution of recording each piece of still picture data extracted by the still picture data extraction device. The recording device records on a record medium each piece of still picture data extracted by the still picture data extraction device at an instruction to execute recording from the record execution instruction device.

According to the fourth aspect of the present invention, the still picture data extracted at an instruction to execute recording from the record execution instruction device is recorded. Thus, excess recording can be avoided.

Furthermore, to attain the above-mentioned objective, the fifth aspect of the present invention provides the image processing apparatus according to the second, third, or fourth aspect. It further includes: an optical image capturing system; an image pickup device; a moving picture data generation device which continuously captures images picked up by the image pickup device through the optical image capturing system in a predetermined period, and generates moving picture data; and a moving picture data recording device which records moving picture data generated by the moving picture data generation device on a record medium.

According to the fifth aspect of the present invention, the image processing apparatus itself has the function of recording moving pictures, and can extract and record a still picture corresponding to the moving picture data recorded by the image processing apparatus.

As described above, according to the present invention, images around a favorite scene of the user can be extracted as continuous shooting during playback of a video file. An extracted image can also be confirmed on the same screen as the playback screen of the moving picture. Thus, an editing process of extracting a still picture as continuous shooting from moving pictures and storing the picture can be easily performed.

BRIEF DESCRIPTION OF THE DRAWINGS

FIGS. 7A to 7B show an example of the display of a menu screen during moving picture editing;
FIGS. 8A to 8B show an example of the display of a menu screen during still picture segmenting edit;
FIG. 9 shows an example of the display of the display of a still picture segmenting edit screen.

DETAILED DESCRIPTION OF THE PREFERRED EMBODIMENTS

Preferred embodiments of the image processing program and the image processing apparatus are described below in detail by referring to the attached drawings.

Figure 1:
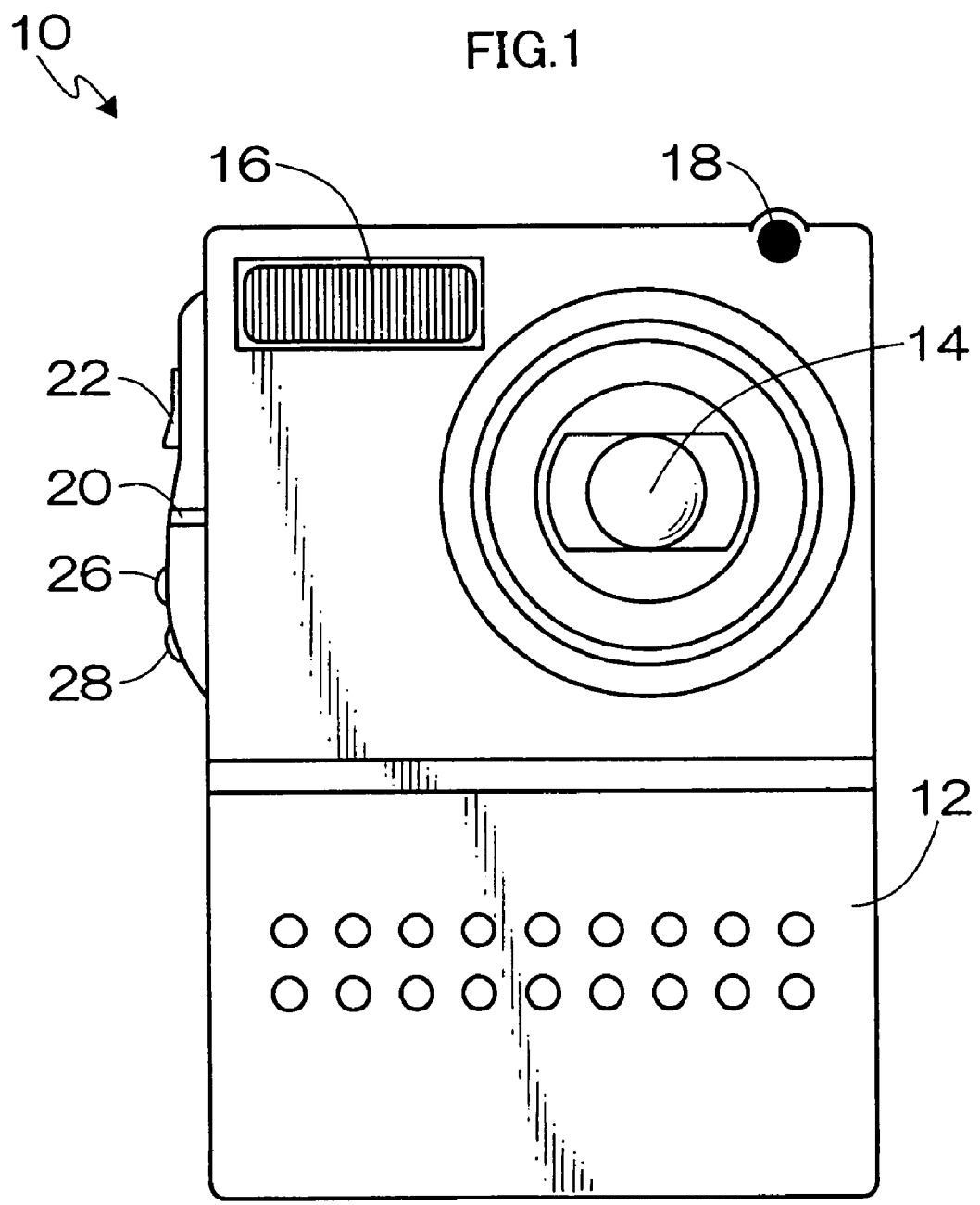
FIG. 1 is a front view of an embodiment of a camera to which the present invention is applied.
Figure 2:
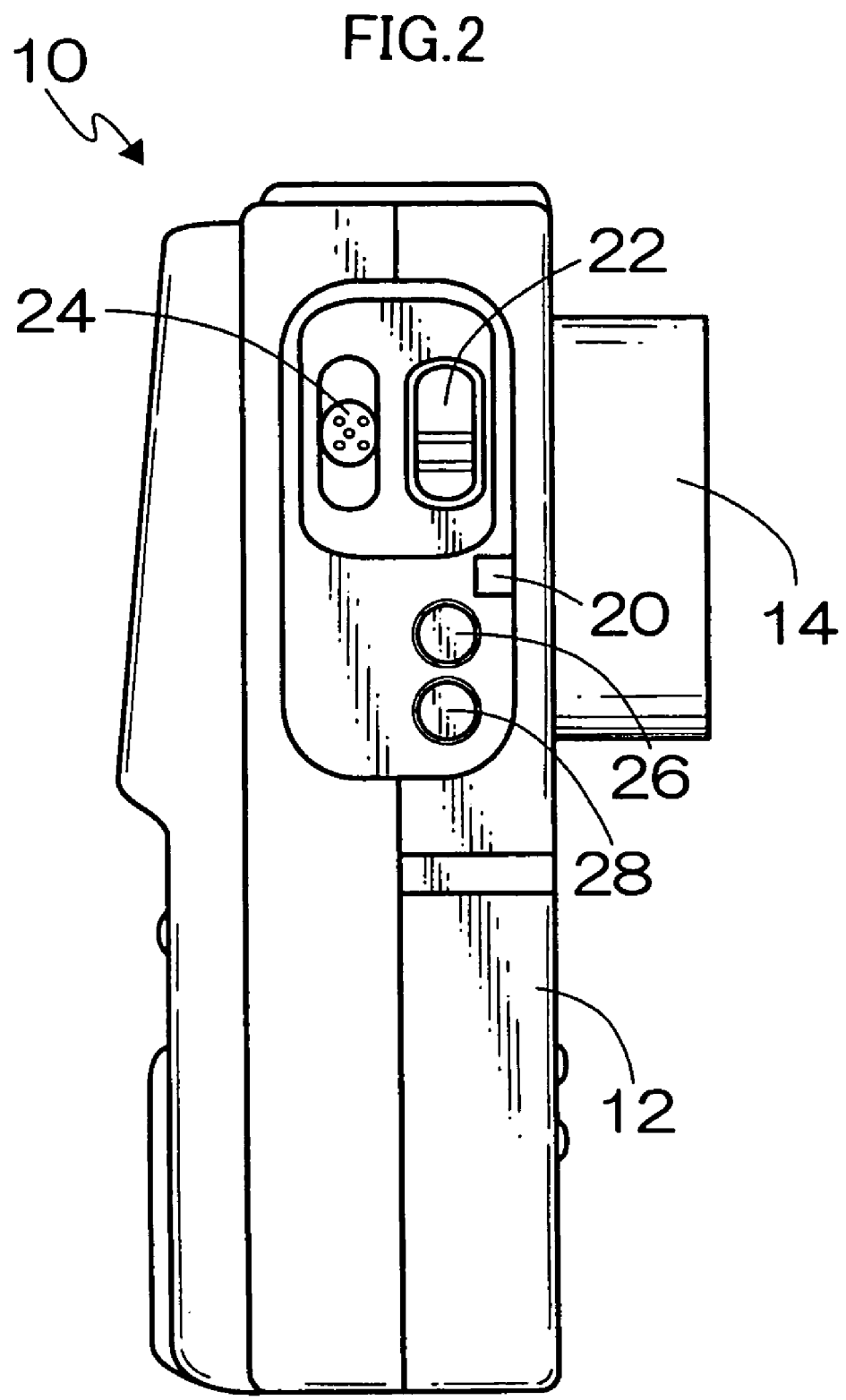
FIG. 2 is a side view of an embodiment of a camera to which the present invention is applied.
Figure 3:
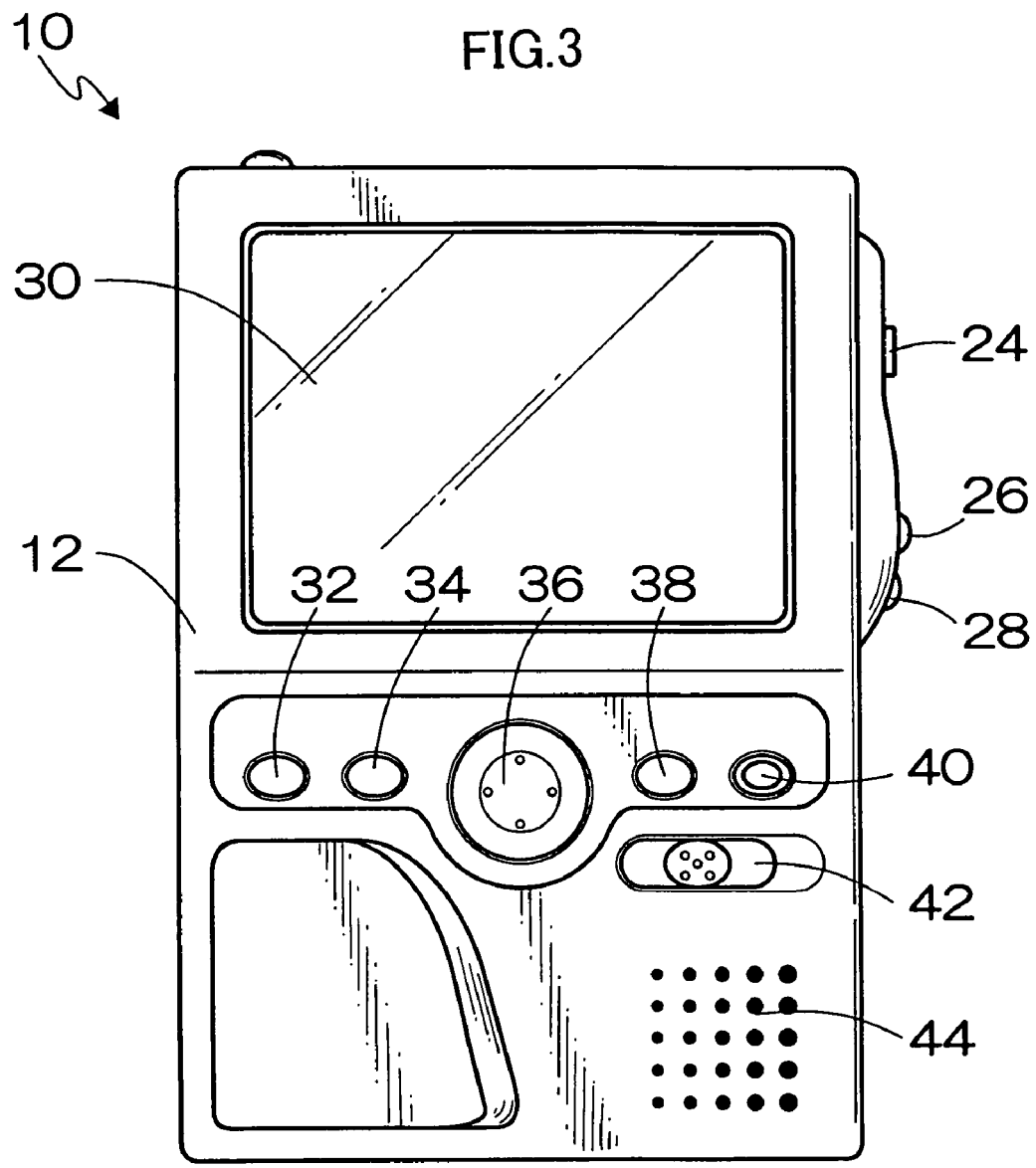
FIG. 3 is a rear elevation of an embodiment of a camera to which the present invention is applied.

FIGS. 1 to 3 are a front view, a side view, and a rear elevation respectively showing an embodiment of a camera to which the present invention is applied.

A camera 10 is a digital camera having the function of recording and playing back both still and moving pictures. A camera body 12 has a taking lens 14, a strobe 16, a strobe dimmer sensor 18, and a self-timer lamp 20 in front. The camera body 12 has a shutter button 22, a zoom lever 24, a strobe button 26, a macro button 28, etc. on the side of the camera body 12. It also has a liquid crystal monitor 30, a display button 32, a menu/OK button 34, a cross button 36, a BACK button 38, a power button 40, a mode switch 42, a speaker 44, etc. at the back. Although not shown in the attached drawings, the camera body 12 has a microphone on the top of the camera body 12.

The mode switch 42 functions as a switch for setting the modes of the camera 10. By sliding the mode switch 42, the camera 10 can be set in one of a still mode, a movie mode, and a playback mode. In the still mode, a still picture is recorded. In the movie mode, a moving picture is recorded. In the playback mode, the recorded still or moving picture is played back.

The shutter button 22 function as a button for designation of capturing a still picture in the still mode, and also functions as a button (what is called a recording button) for designation of start and stop of capturing a moving picture in the movie mode. The shutter button is configured by a two-step switch having a half-press step and a full-press step. In the half-press step, the switch S1 is turned on. In the full-press step, the switch S2 is turned on.

The zoom lever 24 functions as a button for designation of a zoom (telescope/wide view) of a captured image during capturing, and also functions as a switch for designation of a zoom (enlarging/reducing) of a displayed image during playback. The zoom lever 24 is attached as being freely slid in the vertical direction, and a zooming operation can be performed on the telescope (during capturing) or the enlargement (during playback) when it is slid upwards, and a zooming operation can be performed on the wide view (during capturing) or the reduction (during playback) when it is slid downwards.

The strobe button 26 functions as a button for selection of the strobe mode under the still mode, and the macro button 28 functions as a button for designation of turning ON/OFF of the macro function under the still mode.

The liquid crystal monitor 30 is used as a playback screen of a video file recorded on a record medium, and also used as an electronic view finder with a real time picture (through image) during capturing displayed. It is also used as a display screen of a menu when a user performs each setting operation, and as an editing screen of a captured image. The display button 32 functions as a button for designation of a display switch on the liquid crystal monitor 30.

The menu/OK button 34 functions as a button for designation of a switch from a normal screen of each mode to a menu screen, and also as a button for designation of the determination (registration) of selected contents and the execution (confirmation) of a process.

The cross button 36 functions as a button for input of the designation of four directions of upward, downward, right, and left, and is used in selecting a desired item from the menu screen, etc. and designating the selection contents of each set item of each menu.

The BACK button 38 functions as a button for designation of a cancellation, etc. of an inputting operation, and used when each setting operation, etc. is stopped during the operation.

Figure 4:
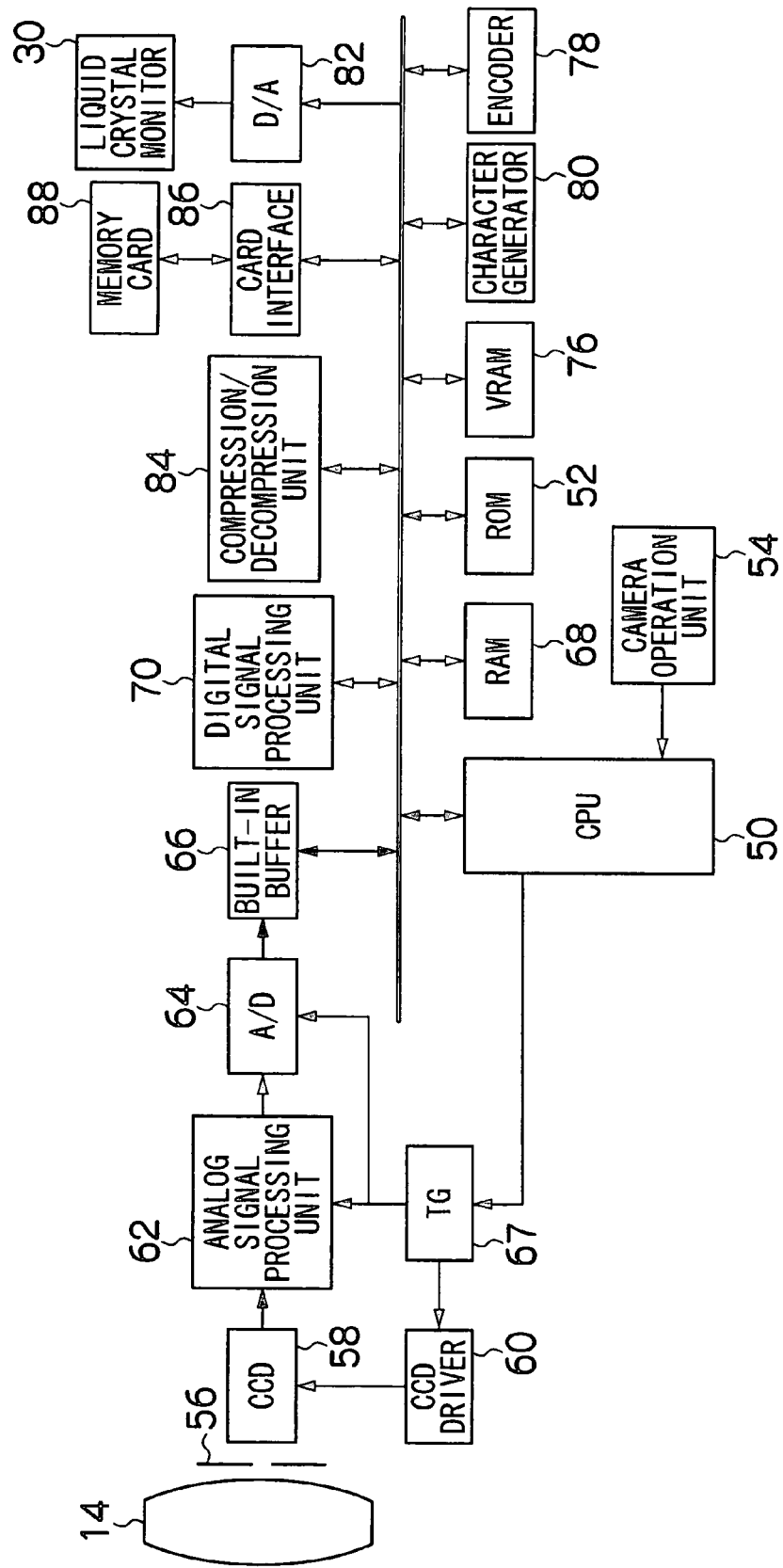
FIG. 4 is a block diagram of the inner configuration of a camera to which the present invention is applied.

FIG. 4 is a block diagram of the internal configuration of the camera 10 according to an embodiment of the present invention shown in FIGS. 1 to 3.

In FIG. 4, a CPU 50 is a control unit for integrally controlling the present camera system, and integrally controls each circuit according to a predetermined based on the input from a camera operation unit 54 such as the above-mentioned shutter button 22, zoom lever 24, strobe button 26, macro button 28, display button 32, menu/OK button 34, cross button 36, BACK button 38, power button 40, mode switch 42, etc. The ROM 52 stores a program processed by the CPU 50 and various data, etc. required in the control.

The quantity of light passing through the taking lens 14 is adjusted by a diaphragm 56, and then input to CCD 58. A photosensor is arranged in a flat array on the photoreceptive surface of the CCD 58. A subject image formed on the photoreceptive surface of the CCD 58 through the taking lens 14 is converted by each photosensor into a signal charge of a quantity depending on the amount of incident light.

The signal charge stored in each photosensor is sequentially read as a voltage signal (video signal) depending on the signal charge based on the pulse provided from a CCD driver 60, and output to an analog signal processing unit 62.

The analog signal processing unit 62 includes a signal processing unit such as a sampling hold circuit, a color separation circuit, a gain adjustment circuit, etc. In the analog signal processing unit 62, a correlative double-sampling (CDS) process and a color separating process on each of the R, G, and B color signals are performed, and the signal level of each color signal is adjusted (pre-white-balance process). The signal output from the analog signal processing unit 62 is converted by an A/D converter 64 into a digital signal, then stored in RAM 68 through a built-in buffer 66, and output to a digital signal processing unit 70 from the RAM 68.

The CCD driver 60, the analog signal processing unit 62, and the A/D converter 64 is provided with a timing signal from a timing generator 67. Using the timing signal, each circuit is synchronized.

The digital signal processing unit 70 is configured by the video signal processing unit such as a brightness/color difference signal generation circuit, a gamma correction circuit, a sharpness correction circuit, a contrast correction circuit, a white balance correction circuit, etc., and a digital signal processor (DSP) including a audio signal processing unit, and processes a video signal and an audio signal at a command from the CPU 50. The video data input to the digital signal processing unit 70 is converted into a brightness signal (Y signal) and a color difference signal (Cr, Cb signal), and a predetermined process such as gamma correction, etc. is performed, and the result is stored in the RAM 68.

The brightness/color difference signal (YC signal) stored in the RAM 68 is output to VRAM 76, and output from the VRAM 76 to an encoder 78. The YC signal output to the encoder 78 is converted into a signal (for example, a color composite picture signal in the NTSC system) in a predetermined system for display together with a character and a symbol provided from a character generator 80 and graphic data, and output to the liquid crystal monitor 30 through a D/A converter 82. Thus, the image contents of video data are displayed on the screen of the liquid crystal monitor 30.

The video data in the RAM 68 is periodically rewritten by a video signal output from the CCD 58, and the video signal generated from the video data is provided for the liquid crystal monitor 30, thereby displaying the image input through the CCD 58 on the liquid crystal monitor 30 on the real-time basis. A user who takes the images confirms the image (through image) displayed on the liquid crystal monitor 30 so that the capturing angle of view, the focus status, etc. can be confirmed.

When the still mode is selected by the mode switch 42, a still picture can be recorded. If the shutter button 22 is half pressed in this state (S1ON), the AF control is performed, and a main subject comes into focus. The AF control is performed by, for example, contrast AF, and the taking lens 14 is moved such that the components of a high frequency of the G signal can be the maximum, and the subject can come into focus.

Simultaneously, metering is performed, and the subject brightness (captured EV value) is obtained. Then, the diaphragm value and the shutter speed (charge accumulation time) during capturing is determined based on the obtained captured EV value. In the metering, for example, the R, G, and B signals are captured, and the captured EV value can be obtained based on the total value obtained by totalizing the R, G, and B signals.

If the shutter button 22 is then fully pressed (S2ON), then images are captured with the determined diaphragm value and a shutter speed with one frame of video data captured in the RAM 68. The video data captured in the RAM 68 is transmitted to a compression/decompression unit 84 through the RAM 68 after the digital signal processing unit 70 performs predetermined signal processing.

The compression/decompression unit 84 compresses video data at an instruction from the CPU 50 in a predetermined compression format (for example, JPEG), and the compressed video data is recorded in a memory card 88 through a card interface 86 as a still picture file in a predetermined format.

Figure 5:
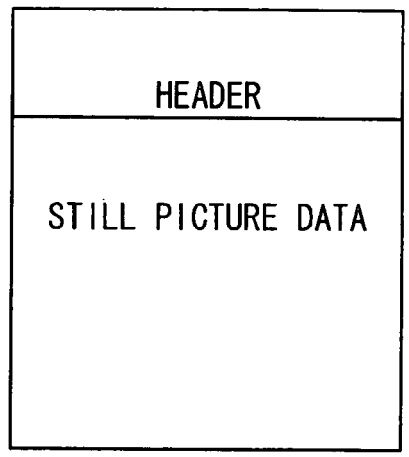
FIG. 5 shows the concept of the structure of a still picture file.

FIG. 5 shows the concept of the structure of a still picture file. As shown in FIG. 5, a still picture file is formed by a header and still picture data. A header stores header information such as a total file size, a data format, etc., thumbnail video data, etc. The still picture data stores the video data compressed in a predetermined compression format (for example, JPEG).

When the movie mode is selected by the mode switch 42, moving pictures with voice can be recorded. If the shutter button 22 is fully pressed (S2ON) in this state, then a recording operation starts, and the video data is captured in the RAM 68 at a predetermined frame rate. The video data captured in the RAM 68 is transmitted to the compression/decompression unit 84 after predetermined signal processing is performed by the digital signal processing unit 70.

The compression/decompression unit 84 compresses video data at an instruction from the CPU 50 in a predetermined compression format (for example, motion JPEG), and the compressed video data is recorded in the memory card 88 through a card interface 86 as a moving picture file (for example, an AVI file) in a predetermined format.

The recording operation terminates after fully pressing the shutter button 22 again. The audio data in the moving picture is obtained by amplifying a signal from the microphone not shown in the attached drawings by an amplifier, and A/D converting the amplified signal.

Figure 6:
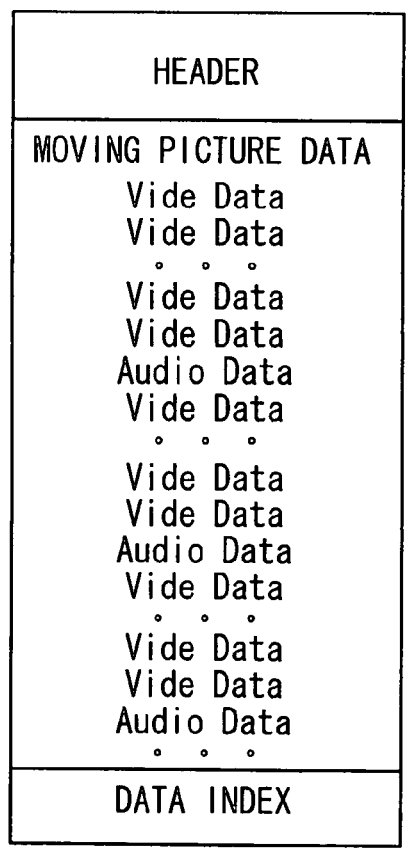
FIG. 6 shows the concept of the structure of a moving picture file.

FIG. 6 shows the concept of the structure of a moving picture file. As shown in FIG. 5, a moving picture file is formed by a header, moving picture data, and a data index.

A header stores header information such as a total file size, a total number of frames, a total audio size, etc., the thumbnail video data of the leading frame, etc.

The moving picture data stores the body of moving picture data. The body of moving picture data is recorded with the video data of a still picture forming an image of each frame as the video data compressed in a predetermined compression format (for example, JPEG) and the corresponding audio data in an interleaved configuration.

In the data index, the information (address, etc.) required in accessing video data and audio data in the moving picture data are recorded. The audio data is managed for each second according to the index information, and the compressed video data is managed for each frame.

When the mode switch 42 selects the playback mode, the video file recorded in the memory card 88 can be played back, and the image of the video file last recorded in the memory card 88 is displayed on the liquid crystal monitor 30. At this time, when the last recorded video file is a moving picture file, the image of the leading frame is displayed. When the right/left key of the cross button 36 is pressed in this state, the frames are sequentially advanced and played back.

The still picture file is played back by first reading the compressed video data stored in the still picture file to the RAM 68 at a command from the CPU 50. Then, it is transmitted from the RAM 68 to the compression/decompression unit 84, and a decompressing process is performed. The decompressed video data is transmitted to the VRAM 76, and output from the VRAM 76 to the encoder 78. The video data output to the encoder 78 is converted together with the character, symbol, and graphic data provided by the character generator 80 into a signal in a predetermined display system, and output to the liquid crystal monitor 30 through the D/A converter 82. Thus, the image of the still picture file is played back and displayed on the liquid crystal monitor 30.

The moving picture file is played back by reading each frame of the compressed video data stored in the moving picture file to the RAM 68 at a command from the CPU 50. Then, it is transmitted sequentially from the RAM 68 to the compression/decompression unit 84, and a decompressing process is performed. Each frame of the decompressed still picture data is transmitted to the VRAM 76, and output from the VRAM 76 to the encoder 78. Each piece of the still picture data output to the encoder 78 is converted together with the character, symbol, and graphic data provided by the character generator 80 into a signal in a predetermined display system, and output to the liquid crystal monitor 30 through the D/A converter 82. Thus, still pictures are sequentially updated and displayed on the liquid crystal monitor 30, and moving pictures are generated.

The playback of a moving picture file is started when a predetermined operation button (for example, it is started by pressing the down key of the cross button 36) is pressed in the state in which the image of the leading frame is displayed on the liquid crystal monitor 30.

The camera 10 has the moving picture editing function so that a favorite scene can be segmented from the captured moving pictures recorded in the memory card 88, and recorded as a still picture in a separate file. At this time, the camera 10 according to the present embodiment can simultaneously record the images around the selected scene in addition to the selected scene.

Described below is the moving picture editing function of the camera 10, that is, the function of segmenting a still picture.

When an editing operation is performed on a moving picture file, the mode switch 42 is first set in the playback mode.

As described above, when the camera 10 is set in the playback mode, the liquid crystal monitor 30 displays the image (the image of the leading frame when a moving picture file is processed) of the video file last recorded in the memory card 88. In this state, the frames are advanced using the left-right key of the cross button 36, and a moving picture file on which the editing operation is performed is selected as shown in FIG. 7A.

After the selection, the menu/OK button 34 is pressed to call the menu screen on the liquid crystal monitor 30. In this example, as shown in FIG. 7B, each menu item is displayed as an icon, and an icon corresponding to "moving picture editing" is selected from among the icons using the left-right key of the cross button 36.

When the icon "moving picture editing" is selected, the liquid crystal monitor 30 displays the menu "moving picture editing", and the item "still picture segmenting" is selected from the menu "moving picture editing" using the up-down key of the cross button 36. In this example, "still picture segmenting edit" and "moving picture segmenting edit" are prepared for the menu "moving picture editing". The "moving picture segmenting edit" is used in segmenting a desired range from moving pictures, and storing the result in a file separate from the original moving picture file.

When the item "still picture segmenting edit" is selected, the liquid crystal monitor 30 displays the mode selection screen of "still picture segmenting edit" as shown in FIG. 8A. As the mode of still picture segmenting edit, a "single shot mode" for segmentation of a favorite scene only and a "continuous shooting mode" for segmentation of images around a favorite scene as continuous shooting are set. From between the two modes, the "continuous shooting" mode is selected using the up-down key of the cross button 36.

When the menu/OK button 34 is pressed after selecting the "continuous shooting mode", the setting screen of the continuous shooting mode is displayed on the liquid crystal monitor 30 as shown in FIG. 8B. On the setting screen, the setting of a segmentation condition, that is, "segmentation range", "number of segmented frames", and "segmentation interval" are set.

The "segmentation range" is used in designating the range of segmenting a still picture by any of "immediately before", "immediately after", and "before and after". The "immediately before" is used in recording several frames immediately before a still picture extract command is issued. The "immediately after" is used in recording several frames immediately after an extract command is issued. The "before and after" is used in recording several frames before and after an extract command is issued.

The "number of segmented frames" is used in designating the number of frames to be segmented as still pictures. In this example, "3 frames", "5 frames", and "7 frames" can be designated.

The "segmentation interval" is used in designating the interval of segmentation for still pictures. In this example, "0.1s", "0.2s", and "0.5s" can be designated.

On the setting screen of the segmentation condition, for example, if the setting of "segmentation range" is "immediately after", the setting of "number of segmented frames" is "3 frames", and the setting of "segmentation interval" is "0.2s", then three still pictures are segmented at intervals of 0.2 second after a still picture extract command is issued as shown in FIG. 8B.

The setting of the segmentation condition is performed using the cross button 36. After the setting, if the icon "OK" displayed on the screen is selected and the menu/OK button 34 is pressed, then the set segmentation condition can be determined.

In this example, it is assumed as the segmentation condition of still pictures that the setting of "segmentation range" is "immediately after", the setting of "number of segmented frames" is "3 frames", and the setting of "segmentation interval" is "0.2s".

When the settings of the segmentation condition is completed, the liquid crystal monitor 30 displays the editing screen for continuous shooting segmentation of still pictures as shown in FIG. 9.

On this still picture segmenting edit screen, the moving pictures to be edited, the still pictures segmented from the moving pictures, the playback bar indicating the playback progress state, and the playback time are displayed as shown in FIG. 9.

The moving pictures to be edited are played back and displayed in the "moving picture display area" provided substantially at the center of the editing screen, and the still pictures segmented from the moving pictures are displayed in the "still picture display areas <1>, <2>, and <3>" provided below the "moving picture display area". The playback bar is displayed above the "moving picture display area", and the playback time is displayed next to the playback bar.

In the initial state, the image of the leading frame in the moving picture file to be edited is displayed in the "moving picture display area". If the down key of the cross button 36 is pressed in this state, the CPU 50 detects this, and starts editing process according to a predetermined editing program.

First, a moving picture file to be edited is played back and displayed in the "moving picture display area" of the liquid crystal monitor 30. At this time, the CPU 50 reads each frame of the compressed video data from the moving picture file to be edited, and stores it in a predetermined area A of the RAM 68.

The compressed video data stored in the area A of the RAM 68 is transmitted to the compression/decompression unit 84 at a command from the CPU 50, and a decompressing process is performed therein. The decompressed still picture data is output to the encoder 78 through the VRAM 76, converted into a signal in a predetermined display system therein, and output to the liquid crystal monitor 30 through the D/A converter 82.

Thus, each frame of the compressed video data is read from the moving picture file to be edited, and the compressed video data stored in the area A of the RAM 68 is rewritten frame by frame. Thus, the still picture data in the moving picture file is updated and displayed frame by frame in the "moving picture display area" of the liquid crystal monitor 30, and a moving picture is formed.

The compressed video data stored in the area A of the RAM 68 is transmitted to the compression/decompression unit 84, and stored in the area B of the RAM 68 at a command from the CPU 50. Plural frames (for example, 10 frames) of compressed video data can be accumulated in the area B of the RAM 68. When the area is full, the older compressed video data is sequentially deleted and replaced with new compressed video data.

Furthermore, the CPU 50 displays the "playback bar" indicating the start of the playback of moving pictures and the playback progress state and the "playback time" on the liquid crystal monitor 30. That is, when the playback starts, the CPU 50 counts the number of frames which have been played back, calculates the ratio to the total number of frames, and displays the progress as the "playback bar" using a bar graph. Thus, the ratio of the playback time to the total recording time is displayed by a bar graph, thereby immediately indicating the playback progress state. In the example shown in FIG. 9, the black area of the playback bar is displayed and enlarged depending on the playback progress (for example, when a moving picture file for 30 seconds is played back for 15 seconds, the black area of the playback bar is enlarged up to half the bar).

Figure 10:
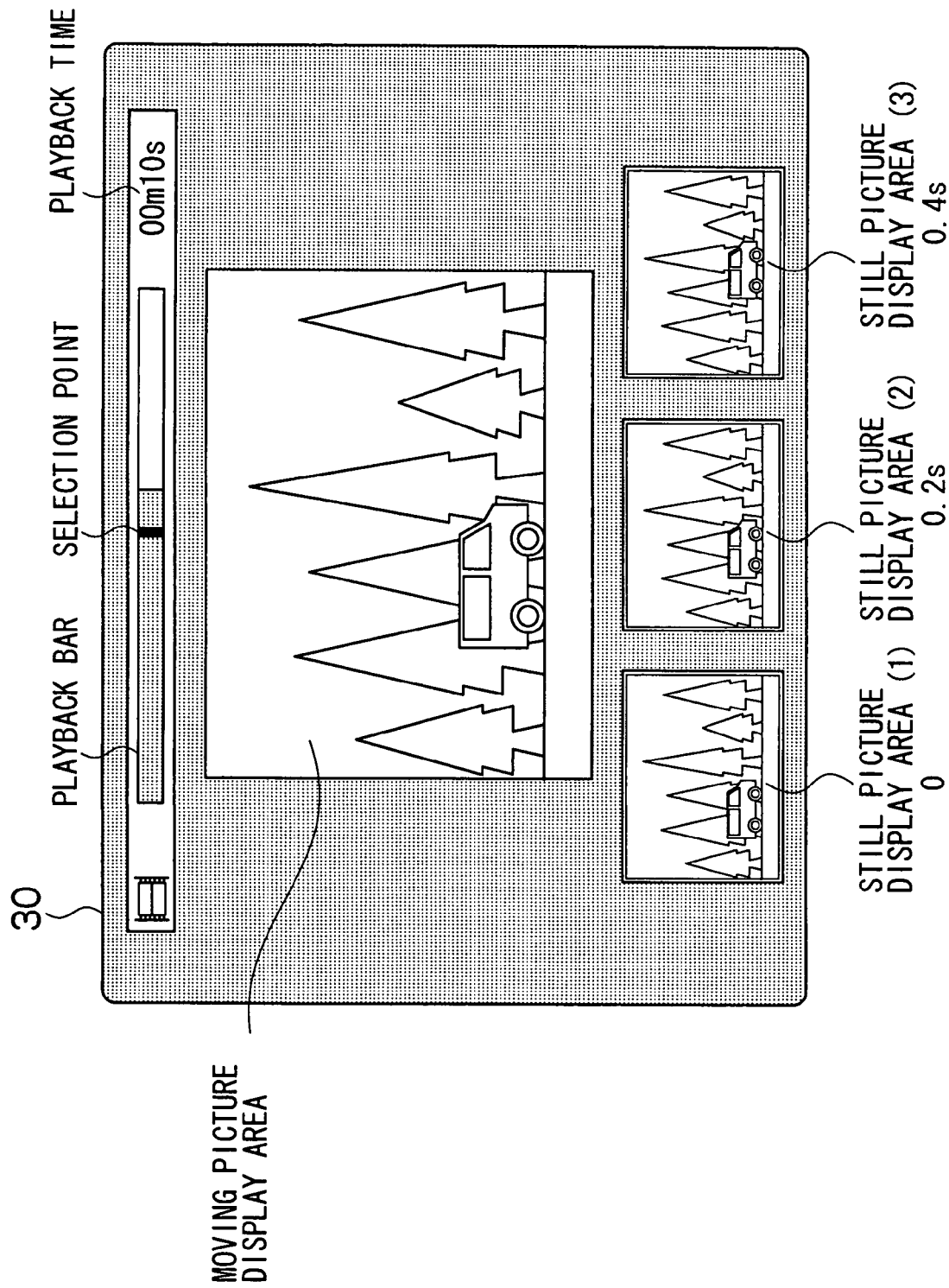
FIG. 10 shows an example of the display of a liquid crystal monitor during still picture segmenting edit.

FIG. 10 shows an example of the display screen of the liquid crystal monitor 30 during moving picture editing. The user checks the moving pictures played back and displayed in the "moving picture display area", and presses the menu/OK button 34 when a favorite scene is displayed.

The menu/OK button 34 functions as a button for input of a still picture extract command in the still picture segmenting editing mode. When it is pressed during playback of moving pictures, the image at the moment of the press (image displayed in the "moving picture display area" the moment when the button is pressed) is extracted and displayed in the "still picture display area <1>". 0.2 and 0.4 seconds after the moment, the images displayed in the "moving picture display area" are sequentially displayed in the "still picture display area <2>" and the "still picture display area <3>" with the passage of the playback time.

That is, when the menu/OK button 34 is pressed, the compressed video data corresponding to the image displayed in the "moving picture display area" is transmitted from the area B of the RAM 68 to the compression/decompression unit 84 at the command of the CPU 50. Simultaneously, it is stored in the predetermined area C of the RAM 68.

The video data processed by the compression/decompression unit 84 in the decompressing process is output to the encoder 78, converted into a display signal, and output to the liquid crystal monitor 30 through the D/A converter 82. Thus, the image (selected image) for which the menu/OK button 34 is pressed is displayed in the "still picture display area <1>".

On the other hand, the compressed video data stored in the predetermined area C of the RAM 68 is stored to be recorded as a still picture file.

In the menu/OK button 34 is pressed, the selection point is displayed on the playback bar.

When the image at the moment when the menu/OK button 34 is pressed is displayed in the "still picture display area <1>", the compressed video data corresponding to the image displayed 0.2 second later in the "moving picture display area" is transmitted from the area B of the RAM 68 to the compression/decompression unit 84 at the command of the CPU 50. Simultaneously, it is stored in the area C of the RAM 68. The video data processed by the compression/decompression unit 84 in the decompressing process is output to the liquid crystal monitor 30 through VRAM 76 the encoder 78 and the D/A converter 82. Thus, the 0.2 second subsequent image to the selected image is displayed in the "still picture display area <2>".

When the 0.2 second subsequent image to the selected image is displayed in the "still picture display area <2>", then the compressed video data corresponding to the image displayed in the "moving picture display area" 0.2 second later (that is, 0.4 second after the menu/OK button 34 is pressed) is transmitted from the area B of the RAM 68 to the compression/decompression unit 84 at the command of the CPU 50. Simultaneously, it is stored in the area C of the RAM 68. The video data processed by the compression/decompression unit 84 in the decompressing process is output to the liquid crystal monitor 30 through the VRAM 76, the encoder 78, and the D/A converter 82. Thus, the 0.4 second subsequent image to the selected image is displayed in the "still picture display area <3>".

Thus, when the menu/OK button 34 is pressed during playback of moving pictures, the image displayed in the "moving picture display area", the 0.2 second subsequent image, and the 0.4 second subsequent image are extracted, and sequentially displayed in the "still picture display areas <1>, <2>, and <3>".

As described above, when the menu/OK button 34 is pressed during playback of moving pictures, the image displayed in the "moving picture display area" the moment when the menu/OK button 34 is pressed, and the images displayed in the "moving picture display area" 0.2 second and 0.4 second after the moment are displayed in the "still picture display area <1>", "still picture display area <2>", and "still picture display area <3>" respectively.

Figure 11:
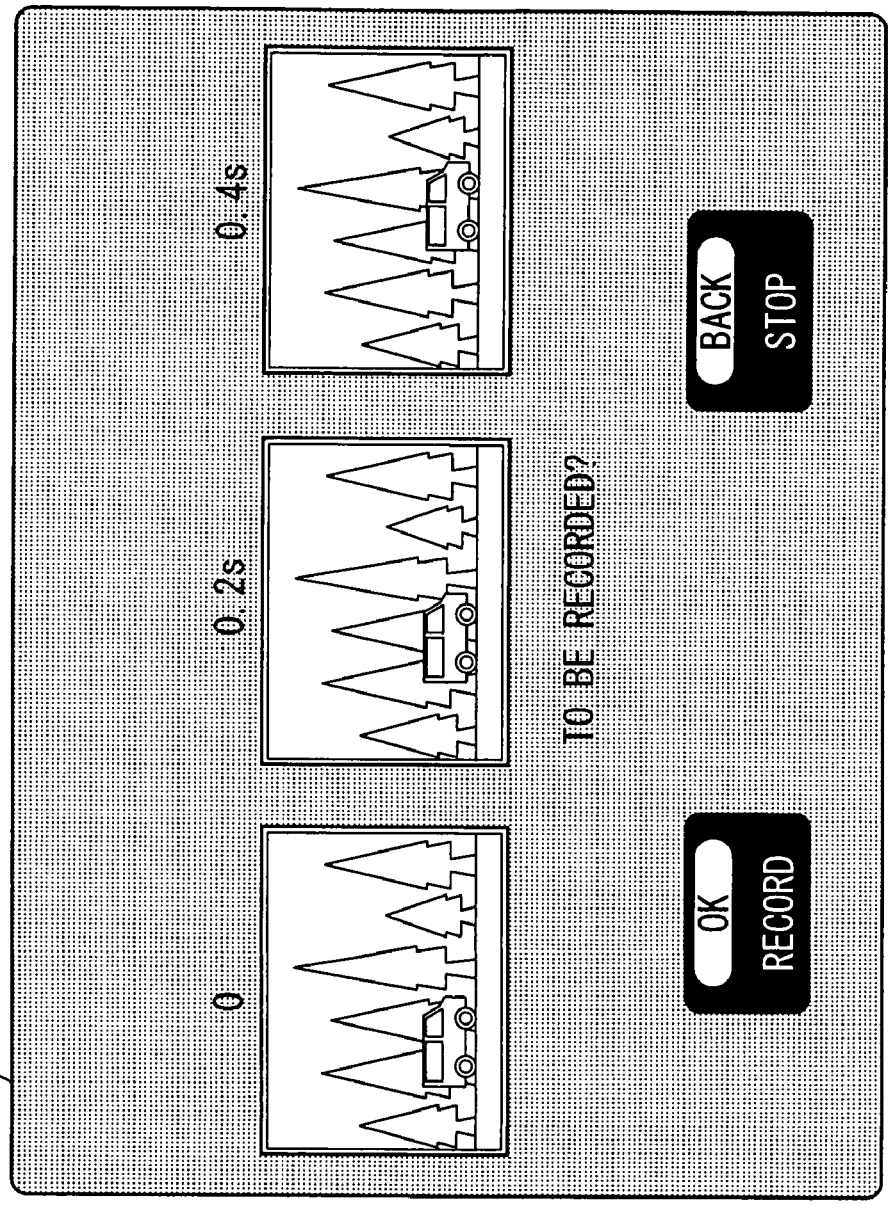
FIG. 11 shows an example of the display of a liquid crystal monitor after still picture segmenting edit.

Moving pictures are continuously played back after the image to be recorded as a still picture is selected. When the playback of moving pictures is completed, the display of the liquid crystal monitor 30 is switched as shown in FIG. 11, and a list of extracted images is displayed with indexes. That is, when the playback of moving pictures is completed, the display of the liquid crystal monitor 30 is cleared, and then the three images extracted during playback of moving pictures are displayed with indexes on the liquid crystal monitor 30 based on the compressed video data recorded in the area C of the RAM 68. The display with indexes is accompanied with the message indicating whether or not the still picture is to be recorded.

When the extracted image is recorded as a still picture file separate from the moving picture file, the user presses the menu/OK button 34. When it is not recorded, the BACK button 38 is pressed.

When the menu/OK button 34 is pressed, each frame of the video data stored in the area C of the RAM 68 at the command of the CPU 50 is sequentially read, and is recorded as a still picture file in a predetermined format in the memory card 88 through the card interface 86. At this time, the header of the still picture file records the position data in the moving picture file as additional information, that is, the data indicating video data in which frame has been extracted.

When the BACK button 38 is pressed, the liquid crystal monitor 30 displays an initial screen (refer to FIG. 9) so that the editing process can be performed again on the same moving picture file. Simultaneously, each frame of the video data stored in the areas B and C of the RAM 68 is cleared.

As described above, the camera 10 according to the present embodiment can perform an editing operation on a file of captured moving pictures, and plural frames of favorite scenes in the moving pictures can be extracted at predetermined intervals as continuous shooting. At this time, a still picture extract command can be issued while playing back moving pictures. When an extract command is issued, an extracted still picture is displayed on the same screen as the playback screen of moving pictures. Thus, the extracted images can be immediately checked, thereby easily performing an editing operation.

According to the present embodiment, when the playback of moving pictures are completed for editing, a list of extracted images is displayed with indexes, and an inquiry as to whether or not a still picture file is to be recorded is issued. However, extracted frames of images can be automatically recorded as a still picture file without a display with indexes after the playback of moving pictures.

Figure 12:
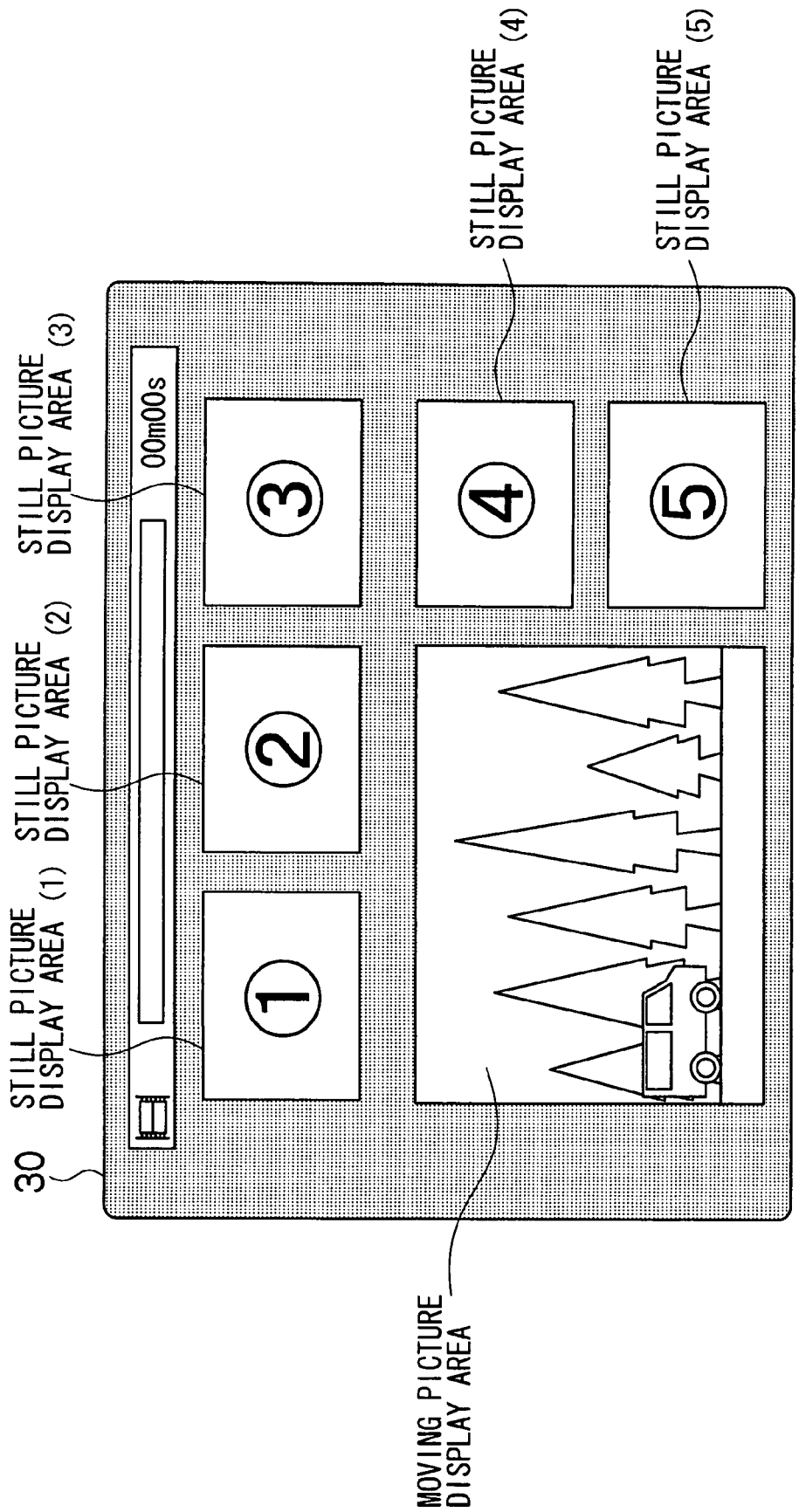
FIG. 12 shows another example of the display of the display of a still picture segmenting edit screen.
Figure 13:
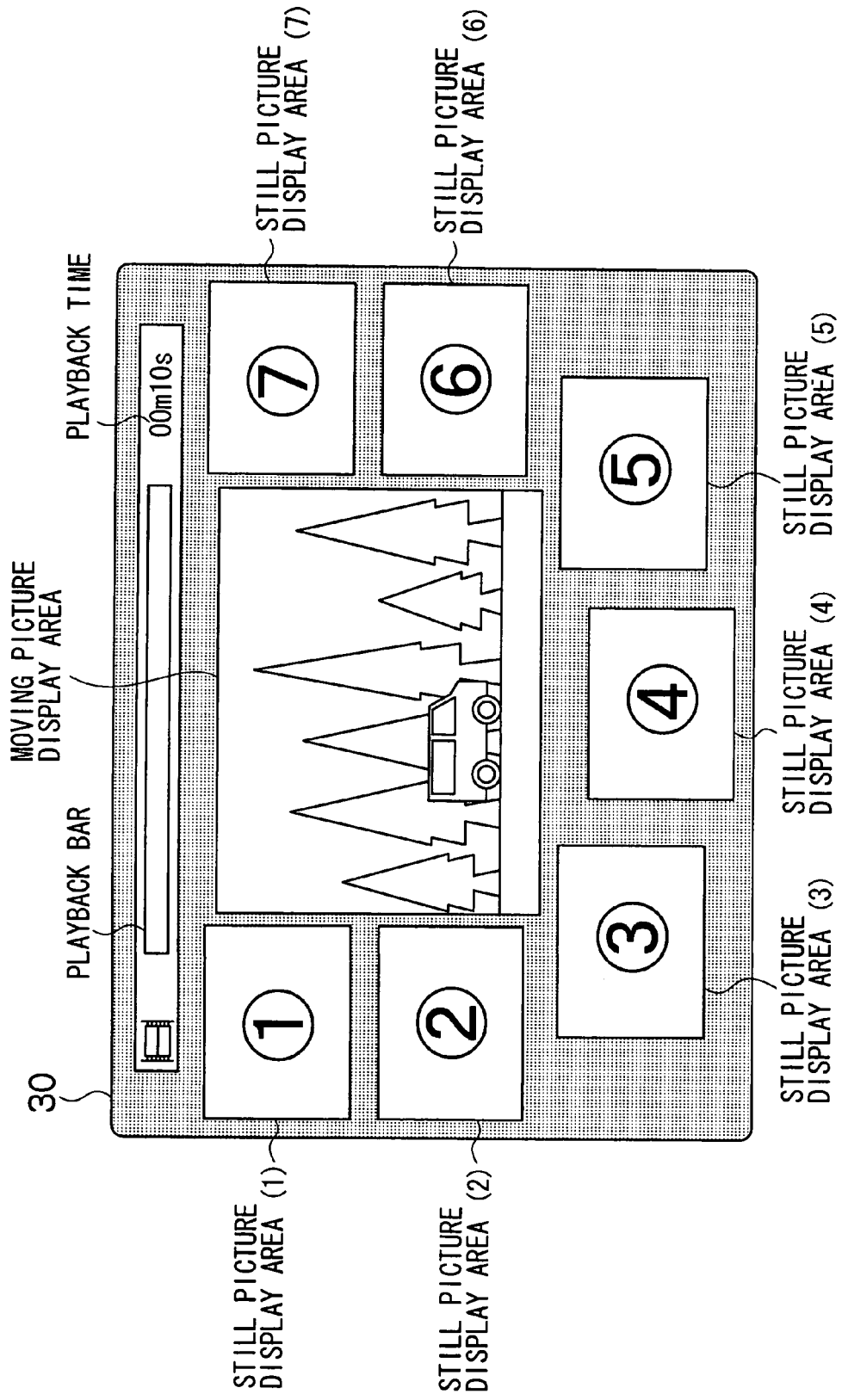
FIG. 13 shows another example of the display of the display of a still picture segmenting edit screen.

According to the present embodiment, three frames of images are extracted every 0.2 second from the moment when the menu/OK button 34 is pressed. However, when five frames of images are extracted, for example, as shown in FIG. 12, the "still picture display areas <1> to <5>" are provided for five frames above and on the right of the "moving picture display area". When seven frames of images are extracted, for example, as shown in FIG. 13, the "still picture display areas <1> to <7>" are provided for seven frames below and on both sides of the "moving picture display area".

Figure 14:
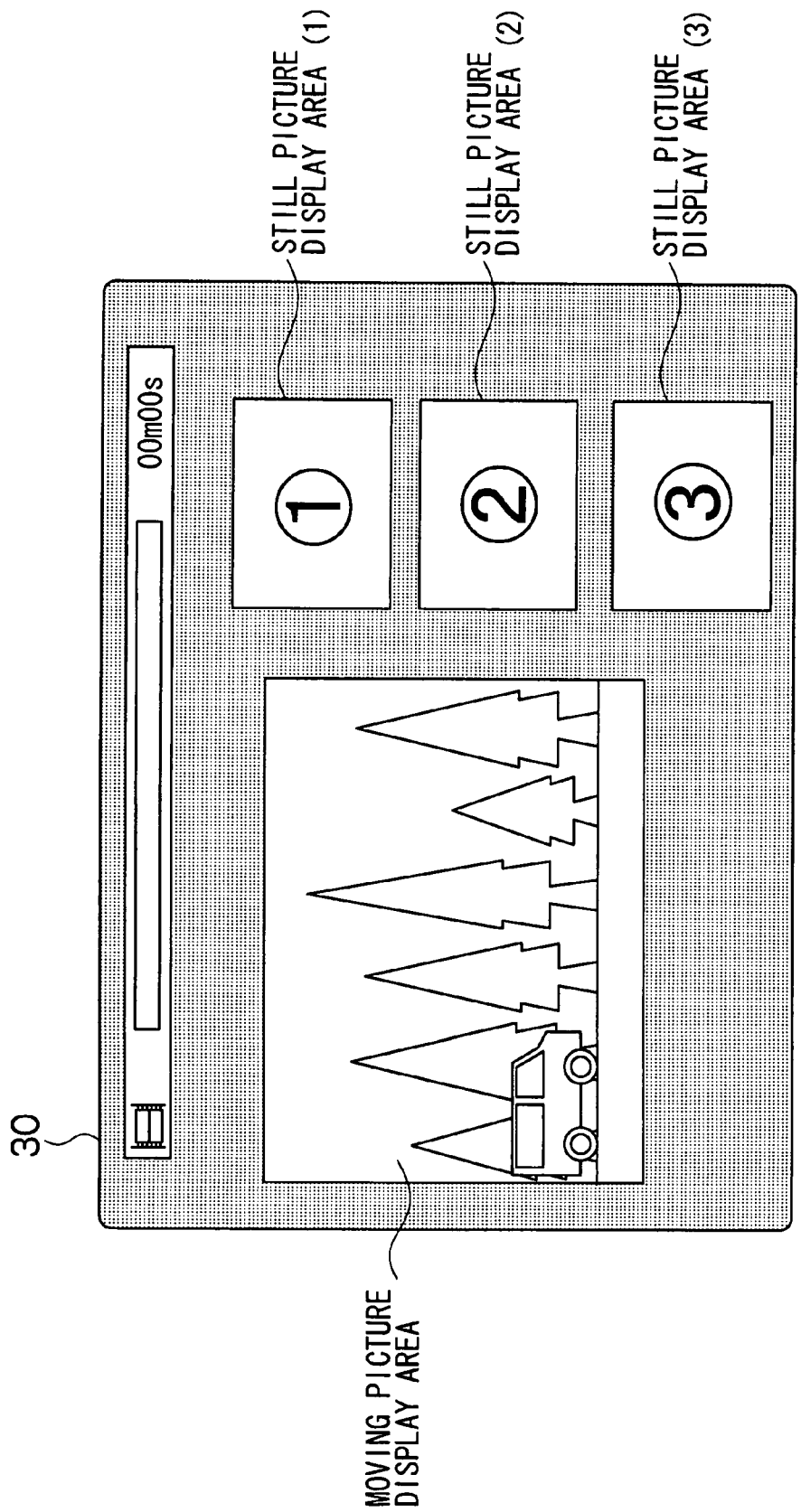
FIG. 14 shows another example of the display of the display of a still picture segmenting edit screen.

When three images are to be extracted, "still picture display areas <1> to <3>" can be provided for three frames on the right as shown in FIG. 14.

As described above, the screen layout in moving picture editing is formed by the "moving picture display area" in which moving pictures recorded in the memory card 88 are played back and displayed, and the "still picture display area" in which the still pictures extracted from the moving pictures are played back and displayed, wherein the "still picture display area" is displayed in an area separate from the "moving picture display area", thereby appropriately changing the areas depending on the size, etc. of the liquid crystal monitor 30.

It is not always necessary that the number of "still picture display areas" is equal to the number of frames of still pictures to be extracted, and at least one is required. For example, when five frames of still pictures are to be extracted, the "still picture display areas" for only three frames can be accepted. Similarly, when three frames of still pictures are to be extracted, the "still picture display areas" for only one frame can be accepted.

Figure 15A:
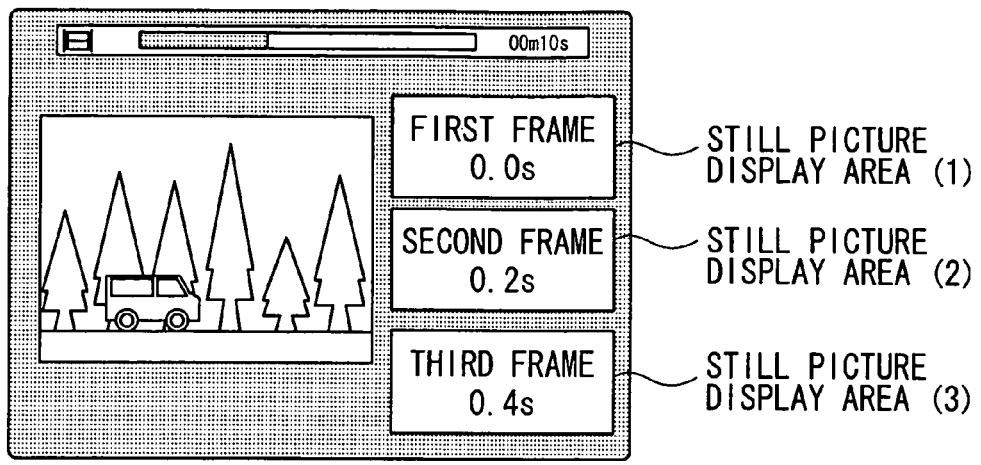
FIGS. 15A to 15C show another example of the display of the display of a still picture segmenting edit screen.
Figure 15B:
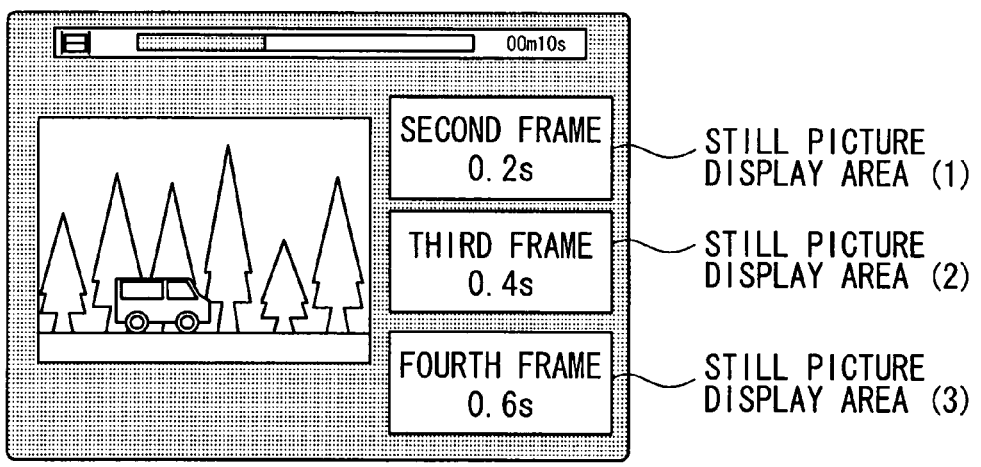
Figure 15C:
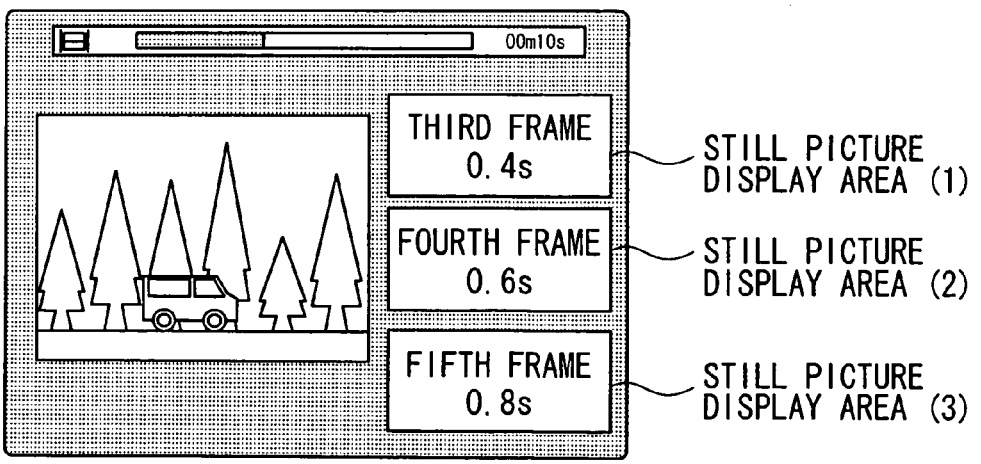

In this case, the extracted still pictures are scrolled to be played back and displayed in the "still picture display area". For example, when five frames of still pictures are extracted and displayed in three frames of "still picture display areas" as shown in FIGS. 15A to 15C, the first to three frames are sequentially displayed in the "still picture display area <1>" to "still picture display area <3>" as shown in FIG. 15A. When the fourth frame is displayed, as shown in FIG. 15B, the first image being displayed in the "still picture display area <1>" is cleared and the frames are one frame shifted. That is, the image of the second frame is displayed in the "still picture display area <1>", the image of the third frame is displayed in the "still picture display area <2>", and the newly extracted image of the fourth frame is displayed in the "still picture display area <3>". Similarly, when the image of the fifth frame is displayed, the image of the second frame being displayed in the "still picture display area <1>" is cleared and the image of the third frame is displayed as shown in FIG. 15C, the image of the fourth frame is displayed in the "still picture display area <2>", and the newly extracted image of the fifth frame is displayed in the "still picture display area <3>".

Thus, when still pictures larger in number than prepared "still picture display areas" are to be extracted, the extracted still pictures are scrolled and displayed in the "still picture display areas". The scrolling direction can be arbitrarily determined. In the case of the display style (display style of the screen during moving picture editing) shown in FIGS. 15A to 15C, the pictures can be scrolled downwards (in the case of the display style shown in FIG. 9, the pictures can be scrolled to right or left).

According to the present embodiment, the case in which the image displayed "immediately after" an extract command is issued is to be extracted is explained as an example, but the image "immediately before" the command is extracted as follows.

For example, when three frames of images relating to the image displayed "immediately before" an extract command is issued are to be extracted at intervals of 0.2 second, the menu/OK button 34 is pressed during playback of moving pictures, the compressed video data corresponding to the image being displayed in the "moving picture display area" 0.4 second before the command is issued is transmitted from the area B of the RAM 68 to the compression/decompression unit 84 at a command of the CPU 50, and stored in a predetermined area C of the RAM 68.

The video data processed by the compression/decompression unit 84 in the decompressing process is output to the liquid crystal monitor 30 through the VRAM 76, the encoder 78, and the D/A converter 82, and the 0.4 second preceding image is displayed in the "still picture display area <1>". On the other hand, the compressed video data stored in the area C of the RAM 68 is stored to be recorded as a still picture file.

When the 0.4 second preceding image is displayed in the "still picture display area <1>", the compressed video data corresponding to the image displayed in the "moving picture display area" 0.2 second before the moment when the menu/OK button 34 is pressed is transmitted from the area B of the RAM 68 to the compression/decompression unit 84 at the command of the CPU 50, and stored in the area C of the RAM 68. The video data processed by the compression/decompression unit 84 in the decompressing process is output to the liquid crystal monitor 30 through the VRAM 76, the encoder 78 and the D/A converter 82, and the 0.2 second preceding image is displayed in the "still picture display area <2>".

When the 0.2 second subsequent image is displayed in the "still picture display area <2>", the compressed video data corresponding to the image displayed in the "moving picture display area" the moment when the menu/OK button 34 is pressed is transmitted from the area B of the RAM 68 to the compression/decompression unit 84 at a command of the CPU 50, and simultaneously stored in the area C of the RAM 68. The video data processed by the compression/decompression unit 84 in the decompressing process is output to the liquid crystal monitor 30 through the VRAM 76, the encoder 78, and the D/A converter 82. Thus, the image at the moment when the menu/OK button 34 is pressed is displayed in the "still picture display area <3>".

Thus, when three frames of images relating to the image displayed "immediately before" an extract command is issued are to be extracted at intervals of 0.2 second, and when the menu/OK button 34 is pressed, the 0.4 second preceding image, the 0.2 second preceding image, and the image displayed the moment when the button is pressed are extracted, and sequentially displayed in the "still picture display area <1> to <3>". The similar processes are performed in the case in which five or seven frames of still pictures are extracted.

When the playback of moving pictures is completed, a list of extracted images is displayed with indexes, an inquiry as to whether or not the still pictures are to be recorded is issued, and the pictures are recorded as described by referring to the embodiments above.

When the image displayed "before and after" the moment when the extract command is issued is extracted, the following process is performed.

For example, when three frames of images relating to the image displayed "before and after" an extract command is issued are to be extracted at intervals of 0.2 second, the menu/OK button 34 is pressed during playback of moving pictures, then the compressed video data corresponding to the image being displayed in the "moving picture display area" 0.2 second before the command is issued is transmitted from the area B of the RAM 68 to the compression/decompression unit 84 at a command of the CPU 50, and stored in a predetermined area C of the RAM 68.

The video data processed by the compression/decompression unit 84 in the decompressing process is output to the liquid crystal monitor 30 through the VRAM 76, the encoder 78, and the D/A converter 82, and the 0.2 second preceding image is displayed in the "still picture display area <1>". On the other hand, the compressed video data stored in the area C of the RAM 68 is stored to be recorded as a still picture file.

When the 0.2 second preceding image is displayed in the "still picture display area <1>", the compressed video data corresponding to the image displayed in the "moving picture display area" at the moment when the menu/OK button 34 is pressed is transmitted from the area B of the RAM 68 to the compression/decompression unit 84 at the command of the CPU 50, and stored in the area C of the RAM 68. The video data processed by the compression/decompression unit 84 in the decompressing process is output to the liquid crystal monitor 30 through the VRAM 76, the encoder 78 and the D/A converter 82, and the 0.2 second preceding image is displayed in the "still picture display area <2>".

When the image displayed at the moment when the menu/OK button 34 is pressed is displayed in the "still picture display area <2>", then the compressed video data corresponding to the image displayed in the "moving picture display area" 0.2 second after the moment when the menu/OK button 34 is pressed is transmitted from the area B of the RAM 68 to the compression/decompression unit 84 at a command of the CPU 50, and simultaneously stored in the area C of the RAM 68. The video data processed by the compression/decompression unit 84 in the decompressing process is output to the liquid crystal monitor 30 through the VRAM 76, the encoder 78, and the D/A converter 82. Thus, the image 0.2 second after the moment when the menu/OK button 34 is pressed is displayed in the "still picture display area <3>".

Thus, when three frames of images relating to the image displayed "before and after" an extract command is issued are to be extracted at intervals of 0.2 second, and when the menu/OK button 34 is pressed, the 0.2 second preceding image, the image at the moment when the button is pressed, and the 0.2 second subsequent image are extracted, and sequentially displayed in the "still picture display area <1> to <3>". The similar processes are performed in the case in which five or seven frames of still pictures are extracted.

When the playback of moving pictures is completed, a list of extracted images is displayed with indexes, an inquiry as to whether or not the still pictures are to be recorded is issued, and the pictures are recorded as described by referring to the embodiments above.

With the camera according to the present embodiment, a playback bar indicating the playback progress state is displayed on the screen when the moving picture editing operation is performed, and the selection point at which a still picture is segmented is displayed on the playback bar. However, the display is arbitrarily performed. When it is displayed, the playback state of moving pictures can be easily checked, and simultaneously the extraction point of a still picture can be quickly checked. On the other hand, when it is not displayed, the limited space of the display screen on the liquid crystal monitor 30 can be efficiently used by increasing the number of still picture display areas and enlarging the areas.

The moving picture file from which a still picture is extracted can store the information about the extracted still picture in the header portion. For example, the thumbnail video data of the still picture obtained at the moment when the menu/OK button 34 is pressed is generated and recorded in the header, and the thumbnail video data can be processed as a representative image of the moving pictures. Otherwise, the thumbnail video data obtained at the moment when the menu/OK button 34 is pressed and the position information (about the image in which frame), etc. can be recorded in the header so that the playback can be started at the moment when the menu/OK button 34 is pressed.

According to the present embodiment, a still picture extract command is input when the menu/OK button 34 is pressed. However, it can be input from other buttons, for example, a shutter button.

The method for extracting a still picture from moving pictures, and recording/playing back the picture is not limited to the above-mentioned embodiments, but can be any method of extracting a still picture from moving pictures for recording/playing back the picture using other well known technology.

In a series of above-mentioned embodiments, the present invention is applied to a digital still image camera, but the application of the present invention is not limited to this. For example, the present invention can be applied to a digital video camera provided with a liquid crystal monitor, a PDA, etc. Furthermore, the moving picture editing process and the playing back process according to the present invention can be provided as application software for a personal computer so that the moving picture editing process and the playing back process can be performed on the personal computer.

What is claimed is:

1. An image processing apparatus comprising:
   a moving picture playback device which plays back moving picture data recorded on a record medium, and displays moving pictures in a moving picture display area set on a monitor;
   a record instruction device which designates a frame of a moving picture displayed in the moving picture display area to be recorded as a still picture;
   a still picture data extraction device which extracts a predetermined number of frames of still picture data immediately before, after, or before and after a moment when a record instruction is received, from moving picture data at predetermined intervals, together with still picture data at the moment when the record instruction is received, based on the record instruction received during playback of the moving picture data:
   a still picture playback device which plays back each piece of the still picture data extracted by said still picture data extraction device, and displays a still picture in a plurality of still picture display areas set in an area different from the moving picture display area on the monitor;
   a recording device which records each piece of the still picture data extracted by said still picture data extraction device on a record medium;
   an optical image capturing system;
   an image pickup device;
   a moving picture data generation device which continuously captures images picked up by said image pickup device through said optical image capturing system in a predetermined period, and generates moving picture data; and
   a moving picture data recording device which records moving picture data generated by said moving picture data generation device on a record medium,
   and further comprising a device that designates the segmentation ranges of immediately before, immediately after and before and after,
   wherein the still picture data extraction device extracts still pictures from the designated segmentation range, and
   wherein the monitor displays a screen which displays the moving picture to be edited, the still pictures segmented from the moving pictures, the playback bar indicating the playback progress state and the playback time.

2. An image processing apparatus comprising:
   a moving picture playback device which plays back moving picture data recorded on a record medium, and displays moving pictures in a moving picture display area set on a monitor;
   a record instruction device which designates a frame of a moving picture displayed in the moving picture display area to be recorded as a still picture;
   a still picture data extraction device which extracts a predetermined number of frames of still picture data immediately before, after, or before and after a moment when a record instruction is received, from moving picture data at predetermined intervals, together with still picture data at the moment when the record instruction is received, based on the record instruction received drift playback of the moving picture data;
   a still picture playback device which plays back each piece of the still picture data extracted by said still picture data extraction device, and displays a still picture in a plurality of still picture display areas set in an area different from the moving picture display area on the monitor;
   a recording device which records each piece of the still picture data extracted by said still picture data extraction device on a record medium;
   an extraction condition instruction device which designates a number of frames and intervals of still picture data to be extracted from the moving picture data, wherein said still picture data extraction device extracts the still picture data at the intervals and the number of frames of the still picture data designated by said extraction condition instruction device from the moving picture data;
   an optical image capturing system;
   an image pickup device;
   a moving picture data generation device which continuously captures images picked up by said image pickup device through said optical image capturing system in a predetermined period, and generates moving picture data; and
   a moving picture data recording device which records moving picture data generated by said moving picture data generation device on a record medium,
   and further comprising a device that designates the segmentation ranges of immediately before, immediately after and before and after,
   wherein the still picture data extraction device extracts still pictures from the designated segmentation range, and
   wherein the monitor displays a screen which displays the moving picture to be edited, the still pictures segmented from the moving pictures, the playback bar indicating the playback progress state and the playback time.

3. An image processing apparatus comprising:
   a moving picture playback device which plays back moving picture data recorded on a record medium, and displays moving pictures in a moving picture display area set on a monitor;
   a record instruction device which designates a frame of a moving picture displayed in the moving picture display area to be recorded as a still picture;
   a still picture data extraction device which extracts a predetermined number of frames of still picture data immediately before, after, or before and after a moment when a record instruction is received, from moving picture data at predetermined intervals, together with still picture data at the moment when the record instruction is received, based on the record instruction received during playback of the moving picture data;

a still picture playback device which plays back each piece of the still picture data extracted by said still picture data extraction device, and displays a still picture in a plurality of still picture display areas set in an area different from the moving picture display area on the monitor;

a recording device which records each piece of the still picture data extracted by said still picture data extraction device on a record medium;

a record execution instruction device which designates execution of recording each piece of still picture data extracted by said still picture data extraction device, wherein said recording device records on a record medium each piece of still picture data extracted by said still picture data extraction device according to an instruction to execute recording from said record execution instruction device;

an optical image capturing system;

an image pickup device;

a moving picture data generation device which continuously captures images picked up by said image pickup device through said optical image capturing system in a predetermined period, and generates moving picture data; and a moving picture data recording device which records moving picture data generated by said moving picture data generation device on a record medium, and further comprising a device that designates the segmentation ranges of immediately before, immediately after and before and after, wherein the still picture data extraction device extracts still pictures from the designated segmentation range, and wherein the monitor displays a screen which displays the moving picture to be edited, the still pictures segmented from the moving pictures, the playback bar indicating the playback progress state and the playback time.

4. An image processing apparatus comprising:

a moving picture playback device which plays back moving picture data recorded on a record medium, and displays moving pictures in a moving picture display area set on a monitor;

a record instruction device which designates a frame of a moving picture displayed in the moving picture display area to be recorded as a still picture;

a still picture data extraction device which extracts a predetermined number of frames of still picture data immediately before, after, or before and after a moment when a record instruction is received, from moving picture data at predetermined intervals, together with still picture data at the moment when the record instruction is received, based on the record instruction received during playback of the moving picture data;

a still picture playback device which plays back each piece of the still picture data extracted by said still picture data extraction device, and displays a still picture in a plurality of still picture display areas set in an area different from the moving picture display area on the monitor;

a recording device which records each piece of the still picture data extracted by said still picture data extraction device on a record medium;

an extraction condition instruction device which designates a number of frames and intervals of still picture data to be extracted from the moving picture data, wherein said still picture data extraction device extracts the still picture data at the intervals and the number of frames of the still picture data designated by said extraction condition instruction device from the moving picture data;

a record execution instruction device which designates execution of recording each piece of still picture data extracted by said still picture data extraction device, wherein said recording device records on a record medium each piece of still picture data extracted by said still picture data extraction device according to an instruction to execute recording from said record execution instruction device;

an optical image capturing system;

an image pickup device;

a moving picture data generation device which continuously captures images picked up by said image pickup device through said optical image capturing system in a predetermined period, and generates moving picture data; and a moving picture data recording device which records moving picture data generated by said moving picture data generation device on a record medium, and further comprising a device that designates the segmentation ranges of immediately before, immediately after and before and after, wherein the still picture data extraction device, extracts still pictures from the designated segmentation range, and wherein the monitor displays a screen which displays the moving picture to be edited, the still pictures segmented from the moving pictures, the playback bar indicating the playback progress state and the playback time.

5. The image processing apparatus according to claims 1, 2, 3 or 4, wherein the still pictures segmented from the moving pictures are displayed as three still picture display areas side by side below the moving picture display area.

6. The image processing apparatus according to claims 1, 2, 3 or 4, wherein the still pictures segmented from the moving pictures are displayed as five frames side by side above or below and on one side of the moving picture display area.

7. The image processing apparatus according to claims 1, 2, 3 or 4, wherein the still pictures segmented from the moving pictures are displayed as seven frames side by side on both sides and below or above the moving picture display area.

8. The image processing apparatus according to claims 1, 2, 3 or 4, wherein the still pictures segmented from the moving pictures are displayed as a still picture display area side by side on one side of the moving picture display area.

* * * * *